(12) United States Patent
Corliss, II

(10) Patent No.: US 9,849,422 B1
(45) Date of Patent: Dec. 26, 2017

(54) METHOD FOR TREATING AIR CONTAMINANTS IN EXHAUST GAS

(71) Applicant: Dorian Francis Corliss, II, Murrieta, CA (US)

(72) Inventor: Dorian Francis Corliss, II, Murrieta, CA (US)

( * ) Notice: Subject to any disclaimer, the term of this patent is extended or adjusted under 35 U.S.C. 154(b) by 0 days.

(21) Appl. No.: 14/720,929

(22) Filed: May 25, 2015

(51) Int. Cl.
| | | |
|---|---|---|
| *F01N 3/00* | (2006.01) | |
| *F01N 3/10* | (2006.01) | |
| *B01D 53/94* | (2006.01) | |
| *B01J 33/00* | (2006.01) | |
| *F01N 3/02* | (2006.01) | |
| *F01N 3/20* | (2006.01) | |
| *F02D 41/02* | (2006.01) | |

(52) U.S. Cl.
CPC .......... *B01D 53/9445* (2013.01); *B01J 33/00* (2013.01); *F01N 3/02* (2013.01); *F01N 3/20* (2013.01); *F02D 41/0235* (2013.01)

(58) Field of Classification Search
CPC .......... F01N 2610/03; F01N 2610/146; F01N 2610/1493; F01N 3/22; F01N 2240/02
USPC .......................................... 60/289, 298, 299
See application file for complete search history.

(56) References Cited

U.S. PATENT DOCUMENTS

| | | | | |
|---|---|---|---|---|
| 3,757,521 A | * | 9/1973 | Tourtellotte | ........... B01D 53/86 422/171 |
| 3,943,709 A | * | 3/1976 | Holt | .......................... F01N 3/22 60/274 |
| 5,224,334 A | * | 7/1993 | Bell | .................... B01D 53/8625 110/212 |
| 5,300,265 A | | 4/1994 | Banks | |
| 5,461,857 A | * | 10/1995 | Itou | ....................... F01N 3/0842 60/276 |
| 5,603,215 A | * | 2/1997 | Sung | .................... B01D 53/944 60/274 |
| 6,029,441 A | * | 2/2000 | Mizuno | ............. B01D 53/9486 60/274 |
| 6,722,125 B1 | * | 4/2004 | Pfalzgraf | ............. F01N 3/0814 60/274 |
| 8,578,704 B2 | * | 11/2013 | Gehret | .................. F01N 3/0205 60/274 |
| 2011/0320132 A1 | | 12/2011 | Zanetti | |

FOREIGN PATENT DOCUMENTS

EP          2 397 216          12/2011

OTHER PUBLICATIONS

Jean P. Roy, Exhaust Temperature Control Enhances Dual Stage Catalyst System Performance on Engines Fueled with Low-Pressure Gas, SAE International, Sep. 10, 2012, 18 pages.

* cited by examiner

*Primary Examiner* — Phutthiwat Wongwian
*Assistant Examiner* — Diem Tran

(57) ABSTRACT

A provision of assemblies and methods for treating exhaust gases from combustion devices to reduce air contaminants in the exhaust gas. The exhaust from a combustion device is cooled, followed by passing the exhaust through first and second catalytic chambers with an oxygen enrichment means in between the catalytic chambers. The catalytic chambers comprise at least one catalyst that substantially reduces nitrogen oxides or carbon monoxide or both.

18 Claims, 1 Drawing Sheet

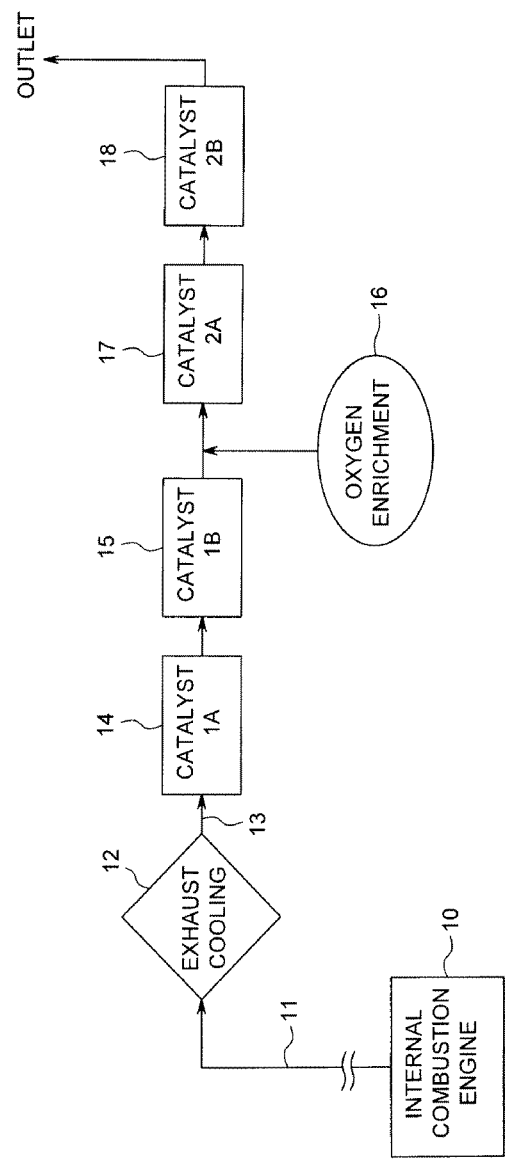

METHOD FOR TREATING AIR CONTAMINANTS IN EXHAUST GAS

CROSS-REFERENCE TO RELATED APPLICATIONS

This application claims the benefit of provisional patent application Ser. No. 62/006,213, filed 2014 Jun. 1 by the present inventor. Additionally, this application claims the benefit of provisional patent application Ser. No. 62/133,363 filed 2015 Mar. 14 by the present inventor.

FEDERALLY SPONSORED RESEARCH

Not Applicable

SEQUENCE OR PROGRAM

Not Applicable

BACKGROUND

Field

The present invention relates to the technical field of treating air contaminants in exhaust gas. More particularly, the present invention relates to a method of treating exhaust gas from combustion devices for reducing air contaminants.

Prior Art

The operation of combustion devices and particularly internal combustion (IC) engines produces small amounts of air contaminants such as carbon monoxide (CO), nitrogen oxides (NO, NO2, or generally $NO_x$), hydrocarbons (HC) and ammonia in exhaust gas. Carbon monoxide, $NO_x$, and ammonia are problematic air pollutants because their regulated values in many geographical regions are set at or below the limits of current technology. $NO_x$ and ammonia emissions are of particular concern. Significant $NO_x$ reductions are needed in California's South Coast Air Quality Management District (SCAQMD) in order to meet National Ambient Air Quality Standards (NAAQS). Ammonia is a regulated toxic air contaminant and a precursor for the formation of particulate matter. SCAQMD assesses fees for certain ammonia emissions. Equipment with ammonia emissions can be subject to Best Available Control Technology (BACT) and Best Available Control Technology for Toxics (TBACT) requirements.

For smaller engines (less than 1000 hp), commonly adopted exhaust gas treatment post combustion involves a single stage catalyst system. In California's SCAQMD, it is not unusual for engines with exhaust treatment systems employing single stage catalysts to frequently exceed their permitted emission limits. For an engine to be in compliance, the air to fuel ratio must be in a narrow range. Air to fuel ratio controllers (AFRCs) control the air to fuel ratio with the use of an oxygen sensor. However, oxygen sensors can be affected by a number of factors such as exhaust temperature changes, load changes, unburned methane in the exhaust, humidity, oxygen sensor age and other factors that might affect oxygen sensor output. Oxygen sensor "drift" is a major cause of noncompliance with emission standards. Oxygen sensor "drift" is a particular problem for engines that operate at variable load.

Some engines employ Selective Catalytic Reduction (SCR) systems to control emissions. These systems have a number of disadvantages, especially for smaller engines. SCR catalysts usually contain larger quantities of costly and rare precious metals and require regular replacement. SCR systems require the storage, handling and pumping of hazardous chemicals such as ammonia or urea which can subject the corresponding facilities to stringent regulatory requirements. A system to control dosing of ammonia or urea is needed. Inappropriate dosing can lead to toxic ammonia emissions exceeding regulatory limits. Further, the SCR systems can require frequent maintenance and specialized technicians.

Previously, there was experimentation with two stage catalyst systems involving the injection of air. Despite the complexity of two catalysts, these systems did not result in markedly improved emission control and, in fact, the two stage catalyst system could result in generation of $NO_x$ on the second stage catalyst.

U.S. Pat. No. 5,300,265 (1994) to Banks et al proposes an apparatus and method for producing an exhaust gas having a low oxygen content. However, Banks does not claim an exhaust treatment system for reducing the concentration of air contaminants such as $NO_x$ or ammonia. The method of U.S. Pat. No. 5,300,265 involves passing of exhaust gas directly from a combustion engine to a catalytic converter for reducing contaminants, whereby the temperature of exhaust gas may have an undesirable affect on the catalyst. Moreover, a means of air injection is placed in between the first and second catalytic converter, according to one embodiment. Further, the exhaust gas is subjected to cooling in a heat exchange means, only after exiting the catalytic converter. Therefore, U.S. Pat. No. 5,300,265 doesn't disclose a method for cooling exhaust gas before entering a catalyst wherein the catalyst is protected from high temperatures. Also, it doesn't suggest the placement of an air to fuel ratio controlling sensor prior to the catalytic converter such that the oxygen sensor is protected from elevated temperature or temperature fluctuations. U.S. Pat. No. 5,300,265 does not disclose an embodiment with only one cooling means before a catalyst.

U.S. Pat. No. 8,578,704 to Gehret et al claims that the first stage catalyst requires temperatures above 800 degrees Fahrenheit. During normal operation, a misfire or other engine malfunction, the catalyst could be exposed to substantially higher temperature exhaust that could result in sintering, a process that deactivates catalysts. Sintering increases exponentially with temperature. As such, U.S. Pat. No. 8,578,704 exposes the valuable and critical first stage catalyst to a faster rate of deactivation than systems that maintain lower catalyst temperatures. Catalysts contain precious metals and represent a substantial cost of the system so the risk posed by sintering is significant.

It is necessary to place the AFRC oxygen sensor upstream of the first stage catalyst because oxygen concentration downstream may be affected by the catalyst. If the oxygen sensor is so placed with U.S. Pat. No. 8,578,704, the sensor will be exposed to potentially large temperature shifts or fluctuations which can cause shifts in the output of the oxygen sensor. Shifts in the oxygen sensor output can cause the AFRC to improperly adjust the engine emissions which can negatively affect engine emissions. Additionally, temperature fluctuations can reduce oxygen sensor life.

SUMMARY OF THE INVENTION

The present invention is a provision of assemblies and methods for reducing air contaminants in the exhaust from combustion devices such as internal combustion engines.

Potential air contaminants such as $NO_x$, CO, and hydrocarbons are substantially reduced by the present method. Ammonia can be substantially reduced by the present invention. The generation of $NO_x$ on the second stage catalyst is substantially reduced. This invention protects the first stage catalyst from elevated temperatures at which sintering of the catalyst increases exponentially. Additionally, the present invention allows placement of the AFRC oxygen sensor in such a way that it is insulated from large temperature changes by a cooling stage. Exhaust temperature changes could negatively affect the performance of the AFRC oxygen sensor which is a critical component for controlling engine emissions.

DRAWINGS—FIGURES

FIG. 1 is a flow diagram showing the apparatus and steps in the process of one embodiment of the present invention.

DETAILED DESCRIPTION—FIG. 1

Definition of Terms

Herein, the term exhaust cooling stage means a process that controls the temperature of exhaust prior to a first catalyst in the exhaust path.
Herein, the term first stage catalyst means a first catalyst in the path of exhaust after the exhaust leaves an engine. In FIG. 1, the first stage catalyst is Catalyst 1A.
Herein, the term second stage catalyst means a first catalyst in the path of exhaust after the oxygen concentration of the exhaust has been enriched by an oxygen enrichment process. In FIG. 1, the second stage catalyst is Catalyst 2A.
Herein, the term $NO_x$ means nitrogen oxides including NO and NO2.
Description Referring now to FIG. 1 there is shown an internal combustion engine 10 from which exhaust is passed to an exhaust cooling stage 12. After the exhaust gas has exited the exhaust cooling stage, it then passes a desirable location for oxygen sensor placement 13 and then the exhaust is passed to a first stage Catalyst 1A 14. Typically, this catalyst will be a three-way catalyst. Next the exhaust optionally passes through Catalyst 1B 15. After the exhaust exits the first stage catalyst, oxygen concentration in the exhaust is increased in an oxygen enrichment process 16. Next, the exhaust is passed to the second stage Catalyst 2A 17. Typically, this catalyst will be a three-way catalyst. Next, the exhaust optionally passes through Catalyst 2B 18 before being passed to the outlet.

In more detail, still referring to FIG. 1 the exhaust gas exiting the internal combustion engine 10 is usually greater than 800 degrees Fahrenheit and is substantially free of oxygen. The exhaust gas, after optionally being used in other processes, will be cooled by the exhaust cooling stage 12 to 392 to 795 degrees Fahrenheit. In an embodiment, the exhaust gas is cooled to a preferable range of 575 to 659 degrees Fahrenheit. The exhaust will then pass a desirable location for oxygen sensor placement 13. Temperature at location 13 will be substantially controlled by the exhaust cooling stage. The exhaust will then be passed to Catalyst 1A where nitrogen oxides and carbon monoxide will be significantly reduced. Next the exhaust optionally passes through Catalyst 1B 15. After the exhaust exits the first stage catalyst, the exhaust is passed to an oxygen enrichment process 16. The concentration of oxygen in the exhaust is enriched to approximately 0.25 to 1.1% before the exhaust is passed to the second stage Catalyst 2A 17 where concentration of carbon monoxide will be significantly lowered, the generation of $NO_x$ will be substantially limited, and the concentration of ammonia can be substantially reduced. Next the exhaust optionally passes through Catalyst 2B 18 before being directed to the outlet. In an exemplary embodiment, the concentration of $NO_x$ that is emitted to the atmosphere is less than 3.7 parts per million (ppm) corrected to 15% oxygen and the concentration of CO that is emitted to the atmosphere is less than 8.5 ppm corrected to 15% oxygen based on time-average data taken over an extended period. In an embodiment, the concentration of ammonia that is emitted to the atmosphere is less than 1.85 ppm corrected to 15% oxygen. Final ammonia concentration is dependent on the temperature of the second stage catalyst. At second stage catalyst exhaust temperatures of approximately 580 degrees Fahrenheit and above, most of the ammonia is converted to $NO_x$. At second stage catalyst exhaust temperatures of approximately 475 degrees Fahrenheit and below, little ammonia is converted to $NO_x$.

In further detail, still referring to FIG. 1, the internal combustion engine 10 could be replaced with other combustion devices such as boilers, turbines, heaters, dryers, kilns or other similar devices used for combustion. The combustion device may comprise a rich burn spark ignited engine. The fuel utilized could be natural gas, propane, butane, biogas, mixtures of those gases, other gaseous fuels or gasoline. In an embodiment, air to fuel ratio is controlled by an AFRC or a system utilizing a venturi mixer and an electronically controlled servo valve. In an embodiment, the air fuel ratio of the combustion device is dithered.

The exhaust cooling stage 12 could be accomplished by a heat exchanger, water spray, cooling fins or other means know to those skilled in the art. The oxygen enrichment 16 could be accomplished by injecting air, gaseous oxygen mixtures, liquid oxygen or other means. The oxygen enrichment 16 could be accomplished with an air pump, compressed gas tank, gas compressor, venturi or other means know to those skilled in the art. For example, the exhaust gas could be enriched with oxygen by allowing it to pass through an air injection chamber located between the first stage catalyst and the second stage catalyst. In some applications, the oxygen enrichment could be pulsed or cycled at a predetermined frequency. In an embodiment, the exhaust is cooled to less than 480 degrees Fahrenheit before it is passed to a second catalyst where the formation of $NO_x$ is substantially limited. In an embodiment, cooling fins are placed between the first stage catalyst and the second stage catalyst.

The advantages of the present invention include, without limitation, protection of the first stage catalyst from elevated, widely fluctuating or rapid increases in exhaust temperatures (>800 degrees Fahrenheit) which are typical for other systems or could result from startup, normal operation, a malfunction of the internal combustion engine system or combustion device or other causes. The exhaust cooling stage will generally maintain a steady temperature for the exhaust exiting the cooling stage. Sintering of the catalyst is a process that increases exponentially with exhaust temperature. Sintering is a process in which the catalyst is deactivated. Catalysts usually contain costly precious metals, so preserving their functionality is advantageous. Cooler exhaust temperatures may extend the life of the catalyst.

An additional advantage of the present invention is that it takes advantage of catalysts which suppliers recently claim can reduce nitrogen oxides at lower temperatures. On Jan. 19, 2011 Miratech issued a $NO_x$ performance guarantee for an engine catalyst at exhaust temperature as low as 600 degrees Fahrenheit at the catalyst inlet, thus allowing new processes to be developed.

Additionally, the present invention allows placement of the AFRC oxygen sensor after the cooling stage so that it is insulated from large temperature fluctuations and higher temperatures. Exhaust temperature fluctuations could negatively affect the performance of the AFRC oxygen sensor which is an important component for controlling combustion and emissions.

Lastly, the present invention minimizes the generation of $NO_x$ on second stage Catalyst 2A and can substantially reduce the concentration of ammonia. Generation of $NO_x$ on the second stage catalyst of most prior art systems is a cause of higher $NO_x$ emissions for the prior art. The oxygen enrichment process is not essential to limit $NO_x$ generation on the second stage catalyst. The present invention has the potential to set a new Best Available Control Technology (BACT) or TBACT standard for ammonia from engines. The catalytic removal of carbon monoxide in the second stage catalyst is so substantial that it allows an engine to operate in compliance with criteria pollutant emission limits over a substantially wider range of air to fuel ratios. Overall, the process results in significant reductions of nitrogen oxides, carbon monoxide, and hydrocarbons in exhaust.

The present invention differs from other art in that the gases are presented to an exhaust cooling stage prior to the first stage catalyst. In contrast, U.S. Pat. No. 8,578,704 (2013) to Gehret specifically teaches that the inter-stage cooling chamber comes after the first stage catalyst. Similarly, engine catalyst manufacturers recommend placing heat exchangers downstream of a catalyst. In the present invention, the temperature of the gases entering the first stage catalyst are lower than in U.S. Pat. No. 8,578,704. In the present invention, the cooling stage gains a new function by protecting the first stage catalyst from higher temperatures which can result in an increased rate of sintering. Sintering increases exponentially with temperature.

Additionally, the present invention differs from other art in that the exhaust cooling stage can gain a second function by insulating the AFRC oxygen sensor from large temperature fluctuations and elevated temperature which can affect oxygen sensor performance and useful life. Unlike the prior art methods such as U.S. Pat. No. 8,578,704, air injection or oxygen enrichment does not occur in an inter-stage cooling chamber. Innovatively, the present invention can substantially reduce the concentration of toxic ammonia emissions and thereby reduce the health risk or toxicity of the exhaust.

In broad embodiment, the present invention is a provision of assemblies and methods to reduce air contaminants such as $NO_x$, CO, and ammonia in the final exhaust, reduce the generation of $NO_x$ on second stage Catalyst 2A, and limit sintering of the first stage catalyst. It provides a site with stable temperature for positioning an oxygen sensor.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method for treating air contaminants in an exhaust gas from a rich burn, spark ignition internal combustion engine, the method comprising the steps of:
    (i) controlling combustion of air-fuel mixture of the rich burn, spark ignition internal combustion engine to produce an exhaust gas that is substantially free of oxygen;
    (ii) passing the exhaust gas to an exhaust cooling stage wherein the exhaust gas is cooled to a predetermined temperature prior to catalytic conversion;
    (ii) passing the exhaust gas from the exhaust cooling stage to a first stage catalyst for substantially reducing NOx and carbon monoxide content in the exhaust gas;
    (iv) enriching the exhaust gas at a location only downstream from the first stage catalyst with oxygen; and
    (v) passing the exhaust gas from the first stage catalyst after enriching with oxygen to a second stage catalyst for substantially reducing carbon monoxide content, before exiting via an outlet.

2. The method of claim 1, further comprises placing an oxygen sensor for the control of air to fuel ratio between the exhaust cooling stage and the first stage catalyst.

3. The method of claim 1, wherein the fuel comprises natural gas.

4. The method of claim 1, wherein the exhaust gas is cooled to a predetermined temperature range of 575 to 659 degrees Fahrenheit.

5. The method of claim 1, wherein the air to fuel ratio is controlled by a system utilizing a venturi mixer and an electronically controlled valve.

6. The method of claim 1, wherein the exhaust gas is cooled to a predetermined temperature range of 392 to 795 degrees Fahrenheit.

7. The method of claim 1, wherein the concentration of $NO_x$ that is emitted to the atmosphere is less than 3.7 ppm corrected to 15% oxygen based on time-average data taken over an extended period.

8. The method of claim 1, wherein the concentration of carbon monoxide that is emitted to the atmosphere is less than 8.5 ppm corrected to 15% oxygen based on time-average data taken over an extended period.

9. The method of claim 1, wherein the cooling stage protects the first stage catalyst from damage due to sintering.

10. The method of claim 1, wherein the substantial catalytic removal of carbon monoxide in the second stage catalyst allows the engine to achieve 3.7 ppm NOx and 8.5 ppm CO, both corrected to 15% oxygen, over a substantially broad range of air to fuel ratios.

11. The method of claim 1, wherein the concentration of ammonia that is emitted to the atmosphere is less than 1.85 ppm corrected to 15% oxygen based on time-average data taken over an extended period.

12. The method of claim 1, wherein the air to fuel ratio of the combustion device is dithered.

13. The method of claim 2, wherein cooling fins are placed between the first stage catalyst and second stage catalyst.

14. The method of claim 1, wherein all exhaust gas passes through the exhaust cooling stage before passing to the first stage catalyst.

15. A method of limiting the generation of NOx on a second stage catalyst receiving an exhaust from a rich burn, spark ignition internal combustion engine, the method comprising:

controlling combustion of air-fuel mixture of the rich burn, spark ignition internal combustion engine to produce an exhaust gas that is substantially free of oxygen;

providing at least one exhaust cooling stage where the exhaust is cooled to a predetermined temperature before being passed to a first stage catalyst for substantially reducing NOx and carbon monoxide content in the exhaust gas, enriching the exhaust gas at a location only downstream from the first stage catalyst with oxygen; and passing the exhaust gas from the first stage catalyst after enriching with oxygen to the second stage catalyst of at least two catalyst stages, whereby the formation of NOx in the exhaust that passes over the second stage catalyst is substantially limited based on an average of measurements taken over an extended time period.

16. The method of claim 15, wherein the exhaust cooling stage cools the exhaust to 390 to 480 degrees Fahrenheit.

17. An apparatus for treating an exhaust gas discharged from a rich-burn, spark ignited internal combustion engine, comprising:

an exhaust cooling stage configured to cool the exhaust gas discharged from the rich burn, spark ignition internal combustion engine to a predetermined temperature prior to a catalytic conversion;

an oxygen sensor, located between the exhaust cooling stage and a first stage catalyst, for generating a signal for use by a system to control the air to fuel ratio of the mixture supplied to the engine;

passing exhaust gas from the exhaust cooling stage to the first stage catalyst to substantially reduce NOx and carbon monoxide content in the exhaust gas;

an oxygen enrichment stage configured to enrich the exhaust gas at a location only downstream from the first stage catalyst with oxygen;

a second stage catalyst adapted to receive the exhaust gas from the oxygen enrichment stage to substantially reduce carbon monoxide content in the exhaust gas; and an outlet for allowing the treated exhaust from the rich burn, spark ignition internal combustion engine to exit the apparatus.

18. The apparatus of claim 17, wherein the exhaust cooling stage cools the exhaust gas to a predetermined temperature range of 575 to 659 degrees Fahrenheit.

* * * * *